Feb. 24, 1931.    P. W. BROWN    1,793,773
ANIMAL TRAP
Filed Nov. 4, 1929
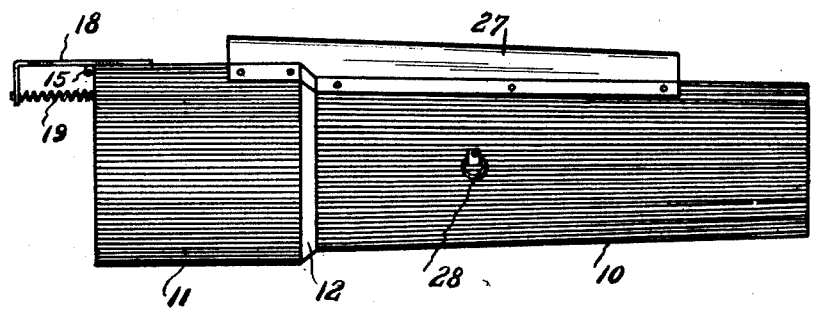
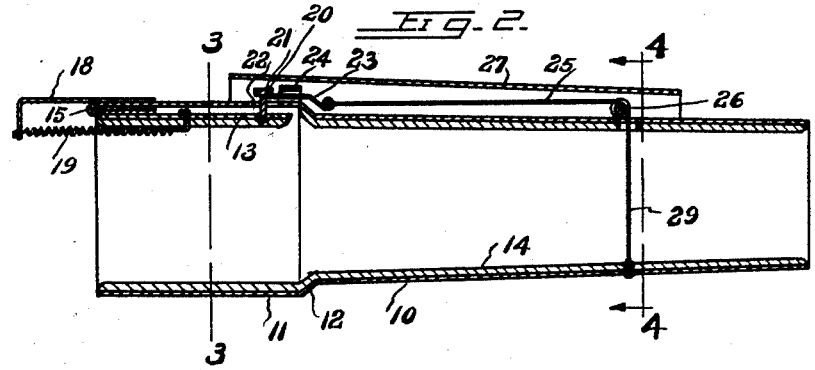
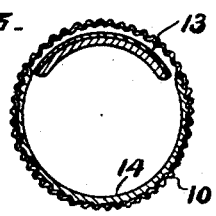
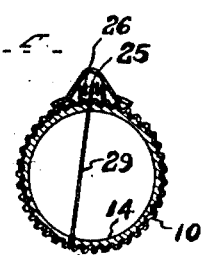
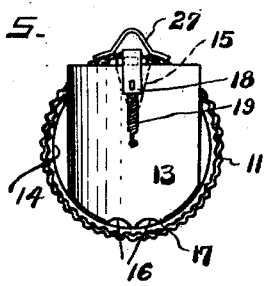
Inventor
PETER W. BROWN
By Frederick E. Bromley
Attorney.

Patented Feb. 24, 1931

1,793,773

UNITED STATES PATENT OFFICE

PETER W. BROWN, OF TWO DOT, MONTANA

ANIMAL TRAP

Application filed November 4, 1929. Serial No. 404,616.

The invention relates to improvements in animal traps as described in the present specification and shown in the accompanying drawings which form part of the same.

The aim of the present invention is to provide a trap particularly designed for catching badgers alive and uninjured and without damaging their fur. A badger on entering its den usually closes the entrance. On coming out it shuffles along the passageway crouched upon its fore-legs. The present trap is therefore particularly designed for badger capture in view of these habits. A long tapering tube constitutes the body of the trap, which tube is longer than the animal and is fitted in the entrance of its hole by sufficiently enlarging it for this purpose. The outer end of the tube may be loosely covered in some convenient manner in order to close it and yet admit air. The badger in coming out of its den unwittingly enters the large end of the tube and advances towards the small end where it trips a catch, releasing a door that closes behind it. The outer or smaller end of the tube is obstructed in some manner to prevent the animal passing therethrough. It is consequently securely and safely held and at the same time well protected from the elements.

Referring to the drawings: Figure 1 is a side elevation of the trap.

Figure 2 is a longitudinal vertical sectional view thereof depicting the door open, or, in other words, depicting the trap as set.

Figure 3 is a vertical sectional view taken on the line 3—3 of Figure 2.

Figure 4 is a similar section taken on the line 4—4 of this figure.

Figure 5 is an end view of the trap depicting the door closed.

Like numerals of reference indicate corresponding parts in each of the figures throughout the drawings.

In the drawings, the reference numeral 10 generally denotes the body of the trap which consists of a long tubular member preferably gradually tapering towards one end for the major part of its length. The other end 11 extends on a uniform diameter to a point as at 12 where it is merged into the tapering part of the body. This portion 11 is slightly enlarged in diameter over the other part so that when the door 13 is raised it will not constrict the passage.

The body is coated with mud on its inside throughout its entire length as at 14 in order to resemble an animal's hole or den. To this end the body is corrugated as illustrated in order to enable the mud to adhere to the inner surface. Other expedients may however be employed for this purpose in lieu of corrugations if so desired and it is not intended to limit the invention in this respect.

The door is curved in cross section so as to conform to the curvature of the enlarged portion 11 of the body as best seen from an inspection of Figure 3. Its upper end is pivotally secured to the top of the trap by a hinge 15, while the lower end is rounded off to conform to the lower side of the trap body. A pair of notches 16 are provided in order to furnish three sharp points as at 17, Figure 5.

18 is a strap fixedly secured to the top of the member 11 and projecting outwardly therefrom. 19 is a coil-spring having one end secured to this strap while the other end is secured to the door 13 in order to urge it to a closed position. 20 is a keeper comprising a stud 21 affixed to the inside of the door in the vicinity of its lower end. This keeper in the closed position of the door passes through an opening 22 in the member 11 and is engaged by a latch 23 slidably fitted in one or more guides as at 24 which guides and latch are located upon the outside of the body 10, the latch itself being free to slide in the head of the stud 21. 25 is a fine cord attached to the latch 23 and extending towards the small end of the body so as to pass over a roller 26 suitably supported in bearings. This cord passes downwardly over the roller to the bottom of the trap and is there secured in any suitable manner such as by a screw eye or other fitting. By this construction the cord intercepts the passage of the body and it is preferable that the intercepting portion of the cord be offset to one side of the body as depicted in Figure 4 so that the animal in entering the trap will get its nozzle past the cord before contacting with it, 27 is a housing or casing extending along the top of the body 10 so as to entirely cover the latch mechanism, cord and roller 26. This housing may be of an inverted V-shape contour in cross section, or otherwise.

In order to prevent dislodgment of the trap it is preferable to provide one or more rings as at 28 through which stakes may be passed and driven into the ground to securely anchor it.

In the use of this trap, it is disposed at the entrance of the badger's den in the manner described in the early part of the specification. To set the trap, the door is raised and the catch 23 inserted in the head of the keeper 20 so as to hold it in this position against its spring pressure, the cord being drawn taut so that a slight deflection of it will release the catch. The animal in coming out of its den contacts with the intercepting portion of the cord 29, thus releasing the door which is closed by the pressure of the spring 19. The further the animal advances into the trap the more securely it is held in it. A very distinctive feature of this trap is that it holds the animal securely without injuring it and furthermore on account of its being below ground protects it from cold wind, which is useful when a healthy animal is required for breeding purposes; and does not lay it open to attack from other animals as does an open trap of the spring-jaw type. The trapped animal also can be bodily taken from the point of capture in the trap, saving providing cages for the purpose.

While the invention is particularly suitable for trapping badgers it is also suited for other animals, particularly weasels and muskrats, and it is to be understood that various sizes of traps may be constructed to conform to the animal for which it is to be used.

What I claim is:—

1. An animal trap consisting of an elongated tubular body having an opening through the top of the body adjacent to one end, a door hinged to the top of one end thereof, a keeper fixed to the inner face of the door so as to project through the opening in the top of the body in the raised position of said door, a latch for engagement with said keeper, and a flexible element attached to the latch and extended to an intercepting position in the vicinity of the other end of the body.

2. An animal trap consisting of an elongated tubular body having an opening through the top of the body adjacent to one end, a door hinged to the top of one end thereof, a spring for closing said door, a stud having a head and affixed to the inner face of the door so as to project through the opening in the top of the body in the raised position of the door, a latch slidably mounted upon the outside of the body for engagement with the head of the stud, a roller mounted upon the top of the body in the vicinity of its other end, and a fine cord attached to the latch, passed over the roller and stretched through the body to the bottom therefore where it is secured.

Signed at Harlowton, Montana, U. S. A., the 8 day of Oct., 1929.

PETER W. BROWN.